US011374856B1

(12) United States Patent
Dikshit et al.

(10) Patent No.: US 11,374,856 B1
(45) Date of Patent: Jun. 28, 2022

(54) SYSTEM AND METHOD FOR PERFORMING SYNCHRONIZATION OF MAXIMUM TRANSMISSION UNIT WITH ROUTER REDUNDANCY

(71) Applicant: Hewlett Packard Enterprise Development LP, Houston, TX (US)

(72) Inventors: Saumya Dikshit, Bangalore (IN); Anil Raj, Bangalore (IN)

(73) Assignee: Hewlett Packard Enterprise Development IP, Houston, TX (US)

( * ) Notice: Subject to any disclaimer, the term of this patent is extended or adjusted under 35 U.S.C. 154(b) by 2 days.

(21) Appl. No.: 17/148,272

(22) Filed: Jan. 13, 2021

(51) Int. Cl.
*H04L 45/24* (2022.01)
*H04L 45/586* (2022.01)
*H04L 45/02* (2022.01)
*H04L 45/00* (2022.01)
*H04L 45/44* (2022.01)

(52) U.S. Cl.
CPC ........... *H04L 45/245* (2013.01); *H04L 45/02* (2013.01); *H04L 45/44* (2013.01); *H04L 45/586* (2013.01); *H04L 45/66* (2013.01)

(58) Field of Classification Search
CPC ....... H04L 45/02; H04L 45/245; H04L 45/44; H04L 45/586; H04L 45/66
USPC ......................................... 709/238–244, 248
See application file for complete search history.

(56) References Cited

U.S. PATENT DOCUMENTS

| 2010/0157843 | A1* | 6/2010 | Qian | .................. | H04L 41/0806 |
| | | | | | 370/254 |
| 2014/0269277 | A1* | 9/2014 | DeCusatis | ............... | H04L 45/70 |
| | | | | | 370/230 |
| 2015/0124622 | A1* | 5/2015 | Kovvali | ................ | H04L 47/125 |
| | | | | | 370/236 |
| 2016/0380902 | A1* | 12/2016 | Sreeramoju | ............. | H04L 69/16 |
| | | | | | 370/401 |
| 2017/0208718 | P1* | 7/2017 | Wood | ............................ | Plt./250 |
| 2018/0109459 | A1* | 4/2018 | Li | ........................ | H04L 41/5009 |
| 2019/0312820 | A1* | 10/2019 | Yu | ........................... | H04L 45/74 |
| 2020/0252344 | A1* | 8/2020 | Krivenok | ................ | H04L 47/36 |

(Continued)

FOREIGN PATENT DOCUMENTS

| DE | 102009050493 A1 * | 4/2011 | ........... H04L 9/0625 |
| JP | 3289574 B2 * | 6/2002 | |

*Primary Examiner* — Younes Naji
*Assistant Examiner* — Da T Ton
(74) *Attorney, Agent, or Firm* — Park, Vaughan, Fleming & Dowler LLP

(57) ABSTRACT

One embodiment can provide a method and system for synchronizing MTU in a WAN edge with router redundancy. During operation, the system may determine a set of interfaces associated with a network device among a plurality of network devices coupled via inter-switch links. The system can determine a set of layer-3 MTU values corresponding to the set of network interfaces and can determine a highest layer-3 MTU value based on the set of determined layer-3 MTU values. The system can synchronize, via the inter-switch links, the highest layer-3 MTU value, resulting in a set of highest layer-3 MTU values at the network device. The system can determine, based on the set of highest layer-3 MTU values, a global highest layer-3 MTU value. The system can derive a layer-2 MTU value based on the global highest layer-3 MTU value and can configure a respective inter-switch link with the layer-2 MTU value.

17 Claims, 5 Drawing Sheets

(56) References Cited

U.S. PATENT DOCUMENTS

2020/0403908 A1* 12/2020 Zhuang ................ H04L 45/42
2021/0377798 A1* 12/2021 Wu ...................... H04L 67/04
2021/0409339 A1* 12/2021 Calciu ................. H04L 69/324

* cited by examiner

SYSTEM AND METHOD FOR PERFORMING SYNCHRONIZATION OF MAXIMUM TRANSMISSION UNIT WITH ROUTER REDUNDANCY

BACKGROUND

Field

This disclosure is generally related to data communication in computer networks. More specifically, this disclosure is related to a system and method for performing synchronization of maximum transmission unit (MTU) in a wide area network (WAN) edge with router redundancy.

BRIEF DESCRIPTION OF THE FIGURES

In the figures, like reference numerals refer to the same figure elements.

DETAILED DESCRIPTION

Figure 1:
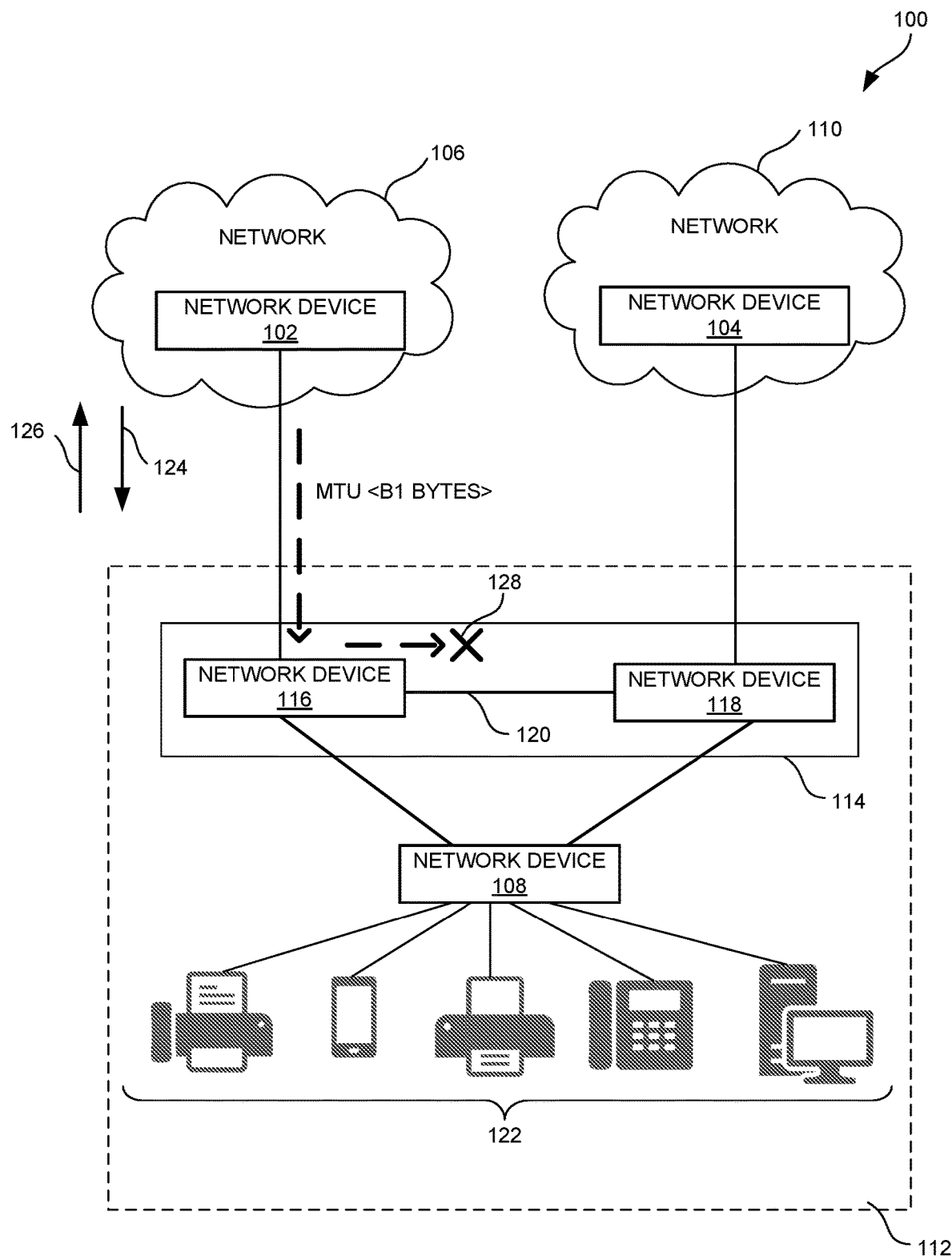
FIG. 1 illustrates an example of a computer network environment including a high availability system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

Embodiments described herein solve the technical problem of synchronizing MTU at a WAN edge with router redundancy, thereby preventing packet loss due to MTU mismatch at the WAN edge routers that provide router redundancy.

In general, a computer network facilitates data to be communicated between a sender and a receiver along a specific routing path via a number of intermediary network devices, e.g., network switches, routers, gateways, etc. Traditionally, network interfaces associated with each intermediary network device may be configured to handle different data packet sizes. For example, a network interface associated with a network device may be configured with a certain maximum allowable data packet size which is referred to as a maximum transmission unit (MTU). In other words, data packets traversing the network device would be forwarded towards the destination device when the data packet size is less than the MTU configured for an outgoing link associated with the network device. The network device would drop the data packets when the size of the data packets is greater than the configured MTU.

Typically, the problem due to MTU mismatch can be solved by fragmenting the data packets into smaller sizes. Alternatively, performing path MTU discovery can also solve the problem due to MTU mismatch. However, the technologies associated with IP fragmentation and path MTU discovery are associated with certain drawbacks, e.g., increase in network traffic that can impact the performance and efficiency of the network, thereby making MTU synchronization in computer networks a challenging task.

Existing technologies can configure a communication interface, i.e., corresponding to a network interface card (NIC), of a network device along a data path to handle data packets with a size larger than the configured MTU. Specifically, a source device that sends an IP data packet may set a "Do Not Fragment" (DF) bit in the IP header to indicate whether the packet is to be fragmented or not. For example, the DF flag may indicate that fragmentation is allowed and the MTU configured for a communication interface on a network device that receives the packet may be less that the packet size. In such a case, the logic in the network device may fragment the packet into smaller packet sizes, thereby preventing the fragmented packets from being dropped. Alternatively, when the DF flag indicates that fragmentation is not allowed, the logic in the network device may decide to drop the packets with sizes larger than the configured MTU and may send an error message to the source device. For example, an Internet Control Message Protocol (ICMP) packet can be sent to the source device to indicate that the packet was dropped.

Although fragmentation of large size data packets may prevent the network device from dropping the fragmented data packets, performing fragmentation of data packets at several network devices along the data path may result in an increased number of fragmented data packets. Such increase in fragmented data packets may increase the processing burden on each network device, thereby resulting in a reduced network efficiency.

Furthermore, fragmentation of data packets can result in an additional burden of making sure that each fragmented data packet reaches the destination successfully to enable correct reconstruction of the entire data packet from the packet fragments. In other words, a receiver may have to receive all the IP packet fragments correctly to reconstruct the Transport Control Protocol (TCP) segment. When the receiver is unable to reconstruct the TCP segment due to one or more missing IP packet fragments, the receiver may drop the entire TCP segment which may result in the source device retransmitting the entire TCP segment again.

To overcome the problems resulting from IP fragmentation, existing systems perform path MTU discovery to determine a highest MTU size along the data path between two IP hosts, i.e., between the source device and the destination device. The source device can be configured to perform path MTU discovery by setting the DF flag bit in the IP header of the data packet sent towards the destination device, i.e., disabling IP fragmentation. The data path between the source device and the destination device may include a number of network devices, e.g., routers, switches, gateways, etc. When the MTU configured on a communication link associated with a first network device along the data path is smaller than the size of the data packet, the logic in the first network device may drop the packet and send an ICMP error message along with the MTU of the first network device to the source device.

In response to the source device receiving the ICMP error message and the MTU, the source device may reduce its outgoing packet size to satisfy the MTU supported by the first network device. The data packet with reduced packet size may pass through the first network device without being dropped. But the reduced data packet size may still be larger than MTU configured on a second network device along the data path. The process of reducing the data packet size and retransmitting the data packets continues until the data packet successfully traverses the network devices along the data path and reaches the destination device. Therefore, path MTU discovery process can result in increased network traffic which may burden the resources on the network devices along the data path and may reduce the network efficiency. In addition, the application of encapsulation, encryption, or overlay network protocols can result in the reduction of the effective end-to-end MTU size which may impact the number of packet re-transmissions to satisfy the MTU's supported on different network devices.

The problems due to mismatched MTU's can be further complicated when load balancing or high availability solutions are deployed at a WAN edge. Specifically, WAN edge routers with router redundancy that represent a high availability solution may lack a mechanism to negotiate and configure a desired MTU on an inter-switch link between routers in a high availability system to prevent traffic loss.

The embodiments described in the present disclosure, solve the above-mentioned problems by providing a system and method to prevent loss of network traffic due to MTU mismatches at the WAN edge routers with router redundancy.

The term "packet" refers to a chunk of data or a datagram.

The terms "packet" and "data packet" are used interchangeably in this disclosure.

Exemplary Computer Network and System

FIG. 1 illustrates an example of a computer network including a high availability system, according to one embodiment. In the example shown in FIG. 1, system 100 may include two WAN networks 106 and 110 coupled to a data center 112 via WAN network devices 102 and 104, respectively.

In general, at a data center, network devices, e.g., switches, routers, etc., need to handle significant amount of data center traffic, a loss of traffic in the data center may render the data center out of service. Any disruption in the data center services may have a significant impact on the network efficiency, user satisfaction, and revenue. Therefore, there is a high demand for integrating high availability solutions at the data center to provide reliable access to a number of computer network services, e.g., cloud-based services, support for increasing use of Internet of Things (IoT) enabled equipment's in numerous industrial applications, etc.

Although high availability and redundancy can be important considerations throughout data center 112, providing such high-availability solutions at the data center edge can be critical. This is because an edge router associated with a data center network may represent a point in the network that can aggregate client connections and internet connections to and from the data center network. The data center edge router can serve as a "bottle neck" for data center traffic and a loss of traffic at this "bottle neck" layer may render the data center out of service. Therefore, there has been an increasing demand for providing increased availability and reliability of routing paths at the data center edge. Specifically, high availability of services can be facilitated at the data center edge via automatic default gateway selections on an IP subnetwork, or, a Virtual Router Redundancy Protocol (VRRP), a multi-chassis link aggregation group (MC-LAG), or other active gateway solutions at the data center edge.

Data center 112 may include a high availability system 114 at its edge. High availability system 114 can include a plurality of network devices, e.g., switches, routers, etc. For simplicity, only two redundant network devices 116 and 118 are shown in FIG. 1. High availability system 114 can facilitate high availability and redundancy of routing paths to enhance the network performance by providing reliable access to a number of services.

Each pair of network devices, e.g., 116 and 118, within high availability system 114 may be coupled via a communication link referred to as an inter-switch link (ISL) 120. High availability system 114 may service a set of devices 122, e.g., desktop computers, servers, printers, mobile devices, storage devices, etc., within a local area network (LAN) via network device 108.

The integration of a high availability solution at the data center edge may result in a different set of problems. Specifically, in FIG. 1, south-bound network traffic 124 from WAN, e.g., network 106 and network 110, that is destined to one or more devices in set of devices 122 may traverse through high availability system 114 via ISL 120 before being forwarded to one or more devices in set of devices 122. Similarly, north-bound traffic 126 from set of devices 122 may traverse via ISL 120 before being sent to a source device via a WAN, e.g., network 106 and network 110.

In other words, before WAN network traffic 124 arrives at a network device, e.g., network device 116, in high availability system 114, the WAN network traffic may have traversed through multiple communication links corresponding to different layer-3 MTU's. Therefore, the data packets arriving at network device 116 may have different packet sizes. These data packets with varied packet sizes may traverse communication link ISL 120 before high availability system 114 can forward the data packets to one or more destination devices in set of devices 122.

Moreover, in high availability system 114, network devices 116 and 118 can operate at layer-2 or at data link layer of the Open Systems Interconnection (OSI) model. The communication link, i.e., ISL 120, can be a layer-2 interface between network devices 116 and 118, and high availability system 114 can configure ISL 120 with a static layer-2 MTU. When the layer-2 MTU configured on ISL 120 associated with network device 116 is less than the MTU of an incoming data packet, the data packet may be dropped. Furthermore, since the network interfaces associated with ISL 120 correspond to a layer-2 interface, no ICMP error messages would be generated when data packets get dropped. Additionally, unlike layer-3 processing which can apply an IP fragmentation process, layer-2 interfaces may not support such fragmentation of data packets. Therefore, a source device sending the data packets via WAN may not receive any error message about the silent data packet drops in high availability system 114. Such silent data packet drops in high availability system 114 may make it difficult for the source device to determine an optimum packet MTU size that might successfully reach the destination device via ISL 120.

For example, a data packet arriving, i.e., south-bound traffic 124, at network device 116 from WAN 106 may have a packet size of 1300 bytes and a communication link between network device 102 in WAN 106 can support a layer-3 MTU of B1 bytes, e.g., 1500 bytes. Since the data packet size 1300 bytes is less than 1500 bytes, the data packets are forwarded to network device 116 in high-availability system 114. Now, if network device 116 is not able to route the received data packets to set of devices 122 due to a missing ARP or a neighbor entry in the routing table, then network device 116 may re-direct the data packets to network device 118 via ISL 120. If ISL 120 is configured with a layer-2 MTU of 1000 bytes, then network device 116 may drop the data packets 128, thereby resulting in loss of data packets.

Furthermore, considering that different data paths in WAN networks 106 and 110 support different layer-3 MTU's, there is a high likelihood of data packets being dropped on ISL 120 due to a MTU mismatch. In addition, layer-2 MTU configured on ISL 120 may correspond to a single static layer-2 MTU value, due to which high availability system 114 may poorly adapt to the changes in layer-3 MTU's configured on one or more network interfaces associated with network devices in WAN 106 or 110.

Similarly, data packets sent from set of devices 122 may arrive at one of the network devices in high availability system 114, e.g., network device 118, and may traverse ISL 120. These data packets may be dropped when their layer-3 MTU data packet size is higher than the layer-2 MTU configured on ISL 120 associated with network device 116 or 118.

The problem due to MTU mismatch could be removed if ISL 120 did not exist. In other words, in the absence of ISL 120, data packets from set of devices 122 would have been successfully forwarded to WAN 106 via uplink interface associated with network device 116 that is coupled to WAN 106. This is because the layer-3 MTU configured on the uplink interface associated with network device 116 would have supported the layer-3 MTU size of the data packets sent from set of devices 122. Further, a MTU mismatch can be mitigated by applying IP fragmentation or path MTU discovery. But with the presence of high availability system 114 it is a challenging task to solve the MTU mismatch problem as layer-2 ISL 120 may not support IP fragmentation or path MTU discovery. Furthermore, due to the high likelihood of packet drops on ISL 120, network devices in WAN 106 and/or 110 may frequently invoke packet fragmentation and defragmentation which can result in degradation of network performance.

Since network devices, e.g., 116 and 118, in high availability system 114 may service same set of devices 122 in the LAN and may also provide similar type of services, the data path parameters and configuration information on network devices 116 and 118 are synchronized. For example, in a MC-LAG deployment, configuration information and forwarding table details, e.g., different routes, Address Resolution Protocol (ARP), Media Access Control (MAC) addresses, etc., can be synchronized between network devices, e.g., 116 and 118, in the MC-LAG pair to ensure that data paths are converged on both the network devices and network traffic flows without glitches.

However, when MC-LAG pair network devices, e.g., 116 and 118, perform path MTU discovery for a data path, the path MTU details learnt on one network device, e.g., network device 116, may not be synchronized with the MC-LAG pair network device, e.g., network device 118. When data packets are dropped on ISL 120 due to MTU mismatch, network devices 116 and 118 may continue to perform independent path MTU discovery for that can result in an unwanted increase in network traffic.

Embodiments described in the present disclosure solve the above-mentioned problems by providing a system and method that can facilitate synchronization of MTU values between network devices in high availability system 114.

Figure 2:
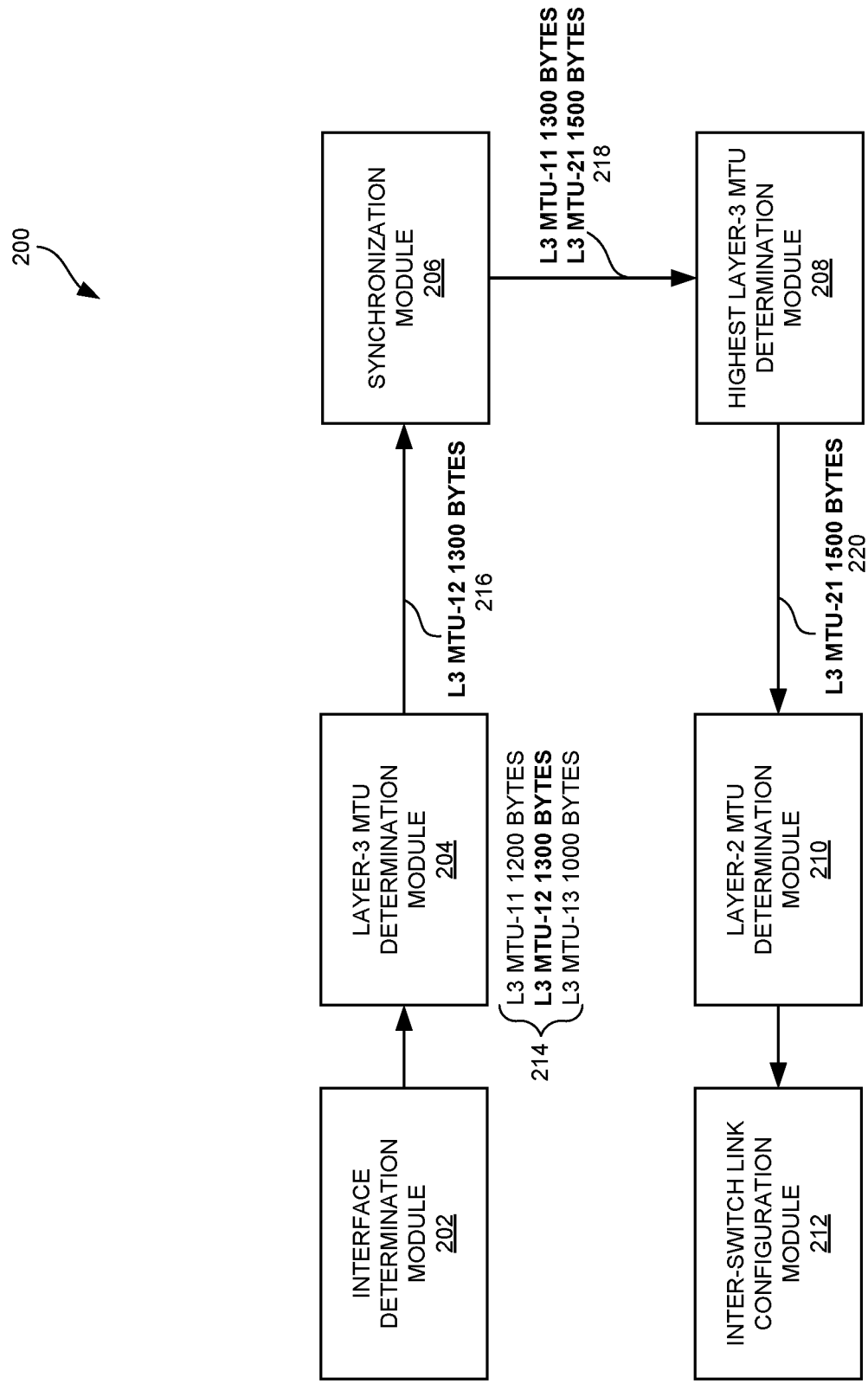
FIG. 2 illustrates an exemplary block diagram of a system for synchronizing MTU at a WAN edge with router redundancy, according to one embodiment.

FIG. 2 illustrates an exemplary block diagram of a system for synchronizing MTU at a WAN edge with router redundancy, according to one embodiment. In the example shown in FIG. 2, system 200 can include an interface determination module 202, a layer-3 MTU determination module 204, a synchronization module 206, a highest layer-3 MTU determination module 208, a layer-2 MTU determination module 210, and an inter-switch link configuration module 212.

Interface determination module 202 may determine one or more network interfaces associated with a network device, e.g., switches, routers, etc., in a high availability system. The one or more network interfaces may correspond to uplink interfaces that may be coupled to the WAN and/or downlink interfaces that may be coupled to LAN. Optionally, system 200 may allow selection of certain network interfaces that provide a high likelihood for data packets to be re-directed over ISL between network devices in the high availability system. This feature may provide the flexibility of selecting a portion of the available network interfaces. In other words, only communication links (corresponding to the network interfaces) that carry traffic that may be re-directed to ISL in the high availability system may be selected. Alternatively, interface determination module 202 may select all the available network interfaces associated with each network device in the high availability system. In one embodiment, interface determination module 202, may include a mechanism to continuously monitor and identify: a new path or a new route that may be added dynamically; an existing path that may be removed or changed dynamically; and updates to path MTU details.

In response to interface determination module 202 determining one or more network interfaces associated with each network device in a high availability system, layer-3 MTU determination module 204 may determine layer-3 MTU values configured on each communication uplink/downlink associated with the determined network interfaces.

For example, in a MC-LAG deployment, a first network device in the MC-LAG pair can have three network interfaces coupled to WAN or LAN, and layer-3 MTU determination module 204 may determine and record the layer-3 MTU values 214 configured on these three interfaces, e.g., L3 MTU-11 (1200 bytes), L3 MTU-12 (1300 bytes), and L3 MTU-13 (1000 bytes). Layer-3 MTU determination module 204 may then determine, based on the three layer-3 MTU values 214, a highest layer-3 MTU value 216, i.e., L3 MTU-12 (1300 bytes) would be the highest layer-3 MTU value.

System 200 may apply a synchronization module 206 to synchronize the highest layer-3 MTU value 216 associated with the first network device with highest layer-3 MTU value associated with a second network device in the high availability system. In other words, the first network device and the second network device may exchange their respective highest layer-3 MTU values so that each network device has an identical set of highest layer-3 MTU values. The high availability system may include additional network devices, i.e., more than two network devices.

In one embodiment, system 200 may apply synchronization module 206 to synchronize path MTU values. For example, in a MC-LAG deployment, MC-LAG configurations and reachability information are synchronized across the member network devices to enable the member network device to be symmetric with similar roles. A network device in a MC-LAG peer pair may independently determine a path MTU value. System 200 may apply synchronization module 206 to synchronize the path MTU values, thereby enabling each member network device to have knowledge of the path MTU values determined on other member network devices. The synchronization of path MTU values across the edge routers, i.e., the member network devices, can prevent packet drops and can avoid the generation of excess packets due to path MTU discovery, thereby improving the network efficiency and performance. In a VRRP deployment, all the backup routers may synchronize with a master router so that each router may include common and consistent view of all the layer-3 MTU values configured on each of the routers.

Highest layer-3 MTU determination module 208, can determine, based on the synchronized layer-3 MTU values 218, a global highest layer-3 MTU value 220. Since the ISL's between the network devices in the high availability system are layer-2 links, system 200 may apply a layer-2 MTU determination module 210 to derive a layer-2 MTU value from global highest layer-3 MTU value 220. For example, the layer-2 MTU may be calculated based on the IP header size for the determined global highest layer-3 MTU, i.e., by reducing the IP header size from global highest layer-3 MTU 220.

System 200 may apply inter-switch link configuration module 212 to configure the ISL between network devices in the high availability system with the derived layer-2 MTU value, thereby ensuring that packets coming from WAN or LAN devices can traverse the ISL without being dropped due to MTU mismatch. In one embodiment, inter-switch link configuration module 212 may dynamically adjust the layer-2 MTU value configured on the ISL associated with the network devices in the high availability system. For example, whenever system 200, specifically interface determination module 202, may identify a new path that is added with a layer-3 MTU larger than the existing global highest layer-3 MTU, system 200 may dynamically update the global highest layer-3 MTU and may dynamically update layer-2 MTU value configured on the ISL based on the updated global highest layer-3 MTU value. Similarly, when system 200 identifies that an existing path has been updated or the path MTU details have changed, system 200 may dynamically update layer-2 MTU value configured on the ISL. In other words, system 200 can dynamically adjust the layer-2 MTU value configured on the ISL, thereby enabling system 200 to dynamically adapt to changes in layer-3 MTU values and to provide reliable access to mission critical services.

Figure 3:
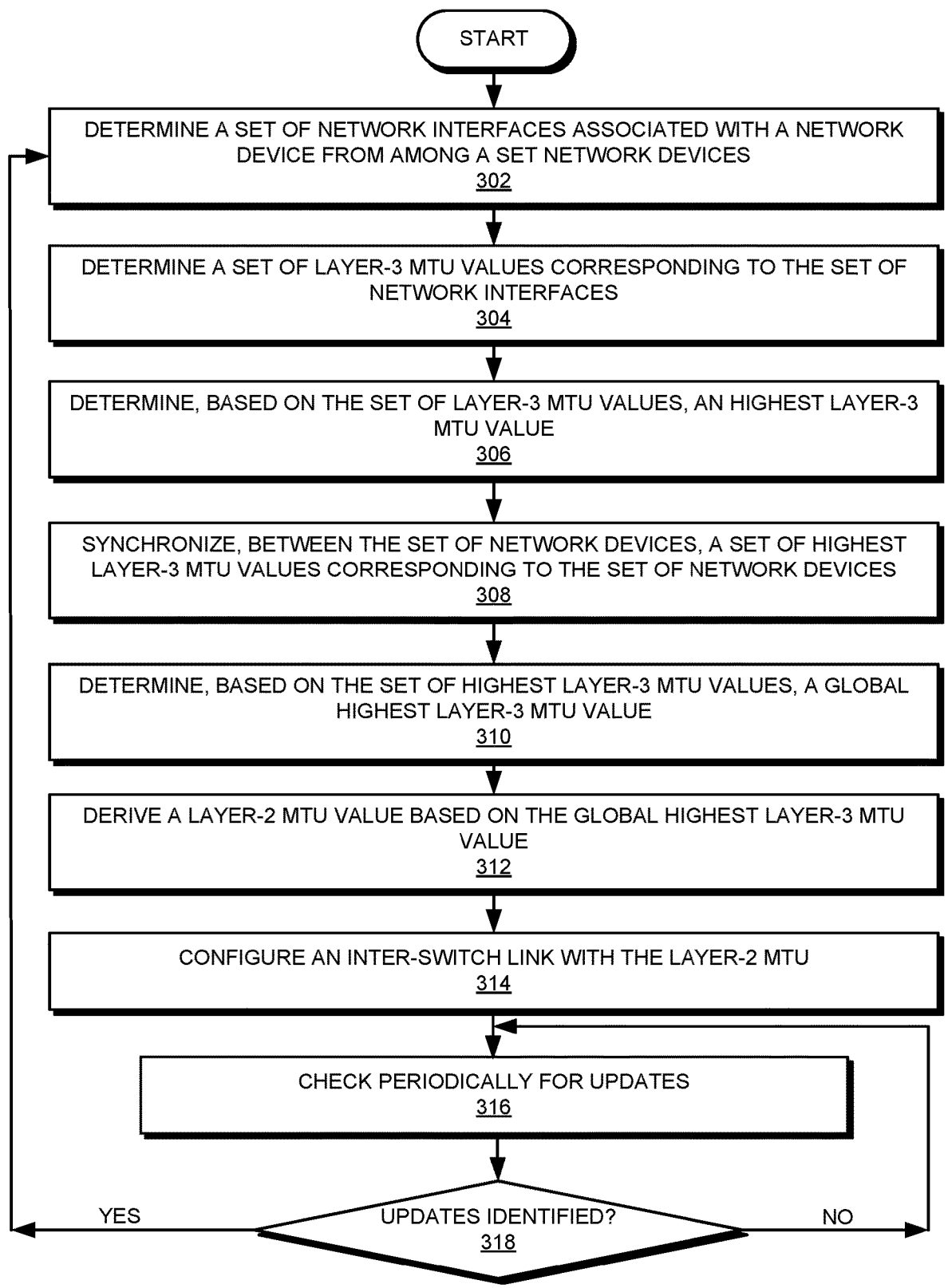
FIG. 3 presents a flowchart illustrating a process for synchronizing MTU at a WAN edge with router redundancy, according to one embodiment.

FIG. 3 presents a flowchart illustrating a process for synchronizing MTU at a WAN edge with router redundancy, according to one embodiment. A high availability system with router redundancy can be deployed at the WAN edge to facilitate reliable services to a set of devices, e.g., IoT enabled devices, desktop computers, printers, mobile devices, etc. The high availability system may include a set of network devices that can be coupled via ISL's. During operation, a system may determine a set of network interfaces associated with a network device from among the set of network devices in the high availability system (operation 302).

The network interface associated with the ISL may be configured with a layer-2 MTU, while the other network interfaces may be coupled to the WAN or the LAN. Each network interface coupled to the WAN or LAN may be configured to support a different layer-3 MTU value. Therefore, the system may determine a set of layer-3 MTU values corresponding to the set of interfaces associated with each network device in the high availability system (operation 304). Based on the set of layer-3 MTU values, the system may determine for a respective network device in the high availability system a highest layer-3 MTU value (operation 306). In other words, for each network device, the system can determine a highest layer-3 MTU value, thereby resulting in a set of highest layer-3 MTU values for the set of network devices in the high availability system.

The system may then synchronize, between the set of network devices, the set of highest layer-3 MTU values corresponding to the set of network devices (operation 308). In other words, the system synchronizes the highest layer-3 MTU value determined on each network device with every other network device in the high availability system, so that each network device can have the same set of the highest layer-3 MTU values. Based on the set of highest layer-3 MTU values, the system may determine a global highest layer-3 MTU value (operation 310). The global highest layer-3 MTU value can be the same for each network device in the high availability system.

The system may derive a layer-2 MTU value based on the global highest layer-3 MTU value (operation 312). For example, the system may calculate the layer-2 MTU value by reducing the IP header size in the global highest layer-3 MTU value. The system may then configure an ISL between the network devices with the derived layer-2 MTU value (operation 314). Optionally, the system may periodically check for updates to layer-3 MTU values corresponding to network interfaces associated with network devices in the high availability system (operation 316). The system may determine whether there exist at least one or more updates (operation 318). When the condition in 318 is satisfied, system may continue to operation 302 to dynamically update the global highest layer-3 MTU value and to dynamically configure the ISL with a new layer-2 MTU value. When the system determines that there are no updates associated with the network interfaces, the operation returns to 316.

Exemplary Computer System and Apparatus

Figure 4:
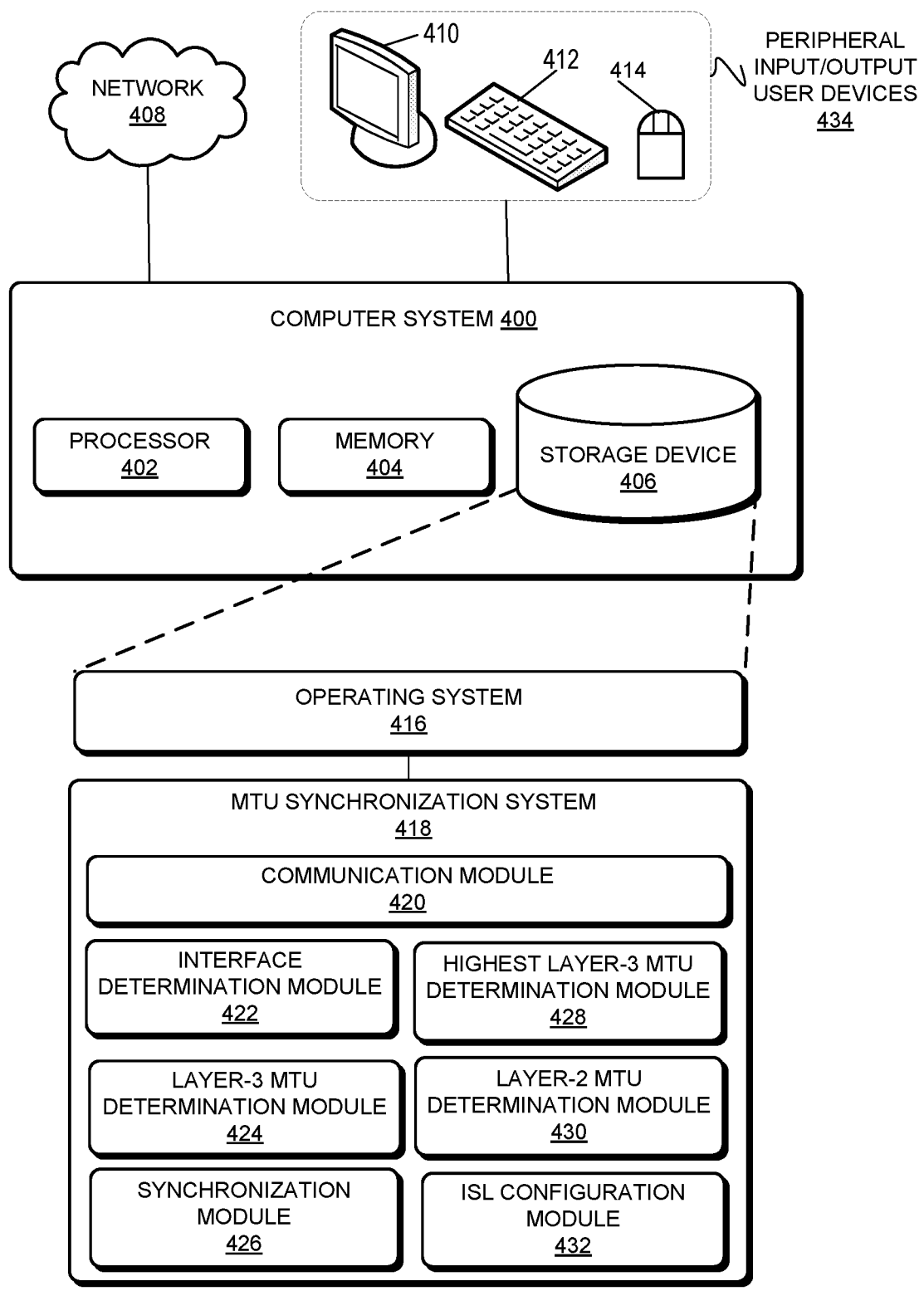
FIG. 4 illustrates an exemplary computer system that facilitates the synchronization of MTU at a WAN edge with router redundancy, according to one embodiment.

FIG. 4 illustrates an exemplary computer system that facilitates the synchronization of MTU at a WAN edge with router redundancy, according to one embodiment. In this example, computer system 400 can include a processor 402, a memory 404, and a storage device 406. Computer system 400 can be coupled to peripheral input/output (I/O) user devices 434, e.g., a display device 310, a keyboard 412, and a pointing device 414, and can also be coupled via one or more network interfaces to network 408. Storage device 406 can store instructions for an operating system 416 and a MTU synchronization system 418.

In one embodiment, MTU synchronization system 418 can include instructions, which when executed by processor 402 can cause computer system 400 to perform methods and/or processes described in this disclosure. MTU synchronization system 418 can optionally include a communication module 420 to receive a selection of one or more network interfaces associated with a respective network device from among a set of network devices within a high availability system. In one embodiment, a user may select the one or more network interfaces via a graphical user interface. MTU synchronization system 418 can further include instructions implementing an interface determination module 422 to determine a set of network interfaces associated with a respective network device. Interface determination module 422 can additionally include a mechanism to continuously monitor and identify any changes to one or more existing paths, or addition of new paths for south-bound traffic arriving at a network interface of a member network device in the high availability system.

MTU synchronization system 418 can include a layer-3 MTU determination module 424 which can determine a set of layer-3 MTU values corresponding to the set of network interfaces for a respective network device. Layer-3 MTU determination module 424 can further determine, based on the set of layer-3 MTU values, a highest layer-3 MTU value associated with each network device. MTU synchronization system 418 can include a synchronization module 426 for synchronizing the highest layer-3 MTU value determined for each network device with other network devices in the high availability system. Synchronization module 426 can enable the network devices in the high availability system to have the same set of highest layer-3 MTU values. MTU synchronization system 418 can further include a highest layer-3 MTU determination module 428 to determine a global highest layer-3 MTU value from the set of highest layer-3 MTU values.

MTU synchronization system 418 can include a layer-2 MTU determination module 430 to derive a layer-2 MTU value based on the global highest layer-3 MTU value. For example, layer-2 MTU determination module 430 may calculate the layer-2 MTU value by reducing the IP header size associated with the global highest layer-3 MTU value. MTU synchronization system 418 can further include instructions implementing an ISL configuration module 432 to configure the ISL between the network devices with the layer-2 MTU value.

Since MTU synchronization system 418 can enable each network device in the high availability system to have an identical and consistent view of the global layer-3 MTU value, the likelihood of packets being dropped on the ISL due to a MTU mismatch can be significantly reduced or prevented. MTU synchronization system 418 can provide improved resource utilization, can be inter-operable with existing high availability solutions, and can support path MTU synchronization via layer-2 ISL link between network devices in a MC-LAG pair to facilitate traffic re-direction.

Figure 5:
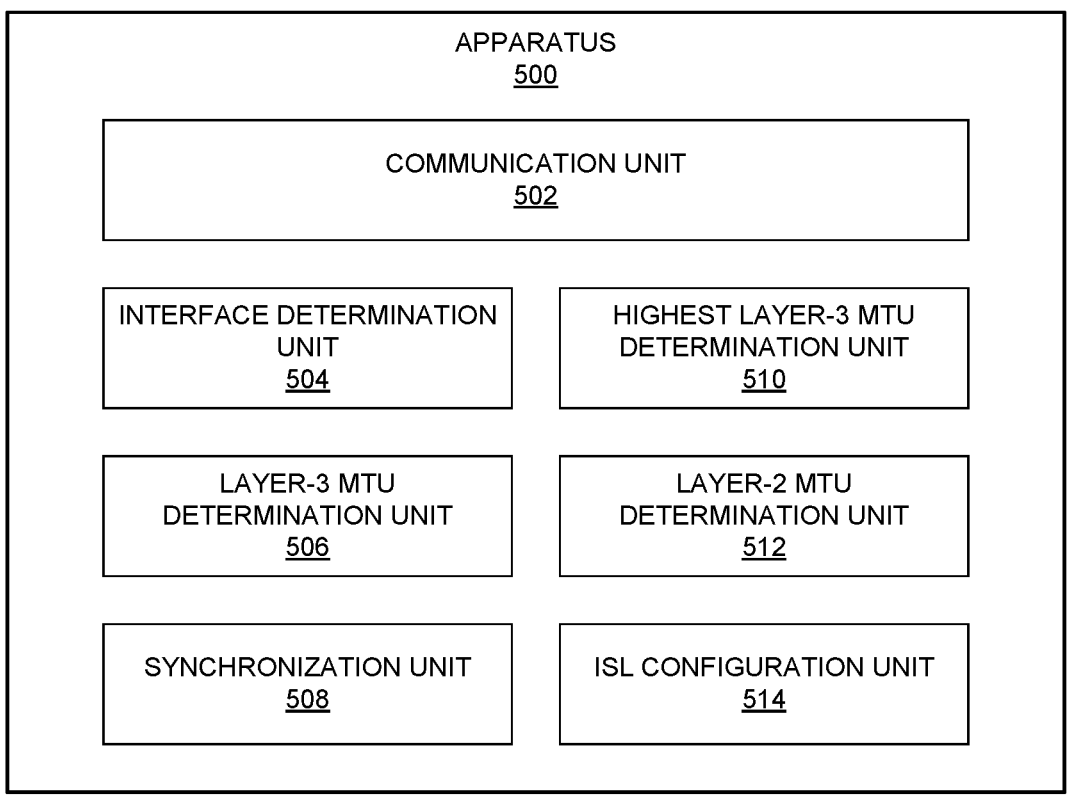
FIG. 5 illustrates an exemplary apparatus that facilitates the synchronization of MTU at a WAN edge with router redundancy, according to one embodiment.

FIG. 5 illustrates an exemplary apparatus that facilitates the synchronization of MTU at a WAN edge with router redundancy, according to one embodiment. Apparatus 500 can include units 502-514, which perform functions or operations similar to modules 420-432 of computer system 400 in FIG. 4, respectively. Apparatus 400 can include a communication unit 502, an interface determination unit 504, a layer-3 MTU determination unit 506, a synchronization unit 508, a highest layer-3 MTU determination unit 508, a layer-2 MTU determination unit 512, and an ISL configuration unit 514.

One embodiment described in the present disclosure can provide a method and system for synchronizing MTU in a WAN edge with router redundancy. During operation, the system may determine a set of interfaces associated with a network device among a plurality of network devices coupled via inter-switch links. The system can determine a set of layer-3 maximum transmission unit (MTU) values corresponding to the set of network interfaces. The system can then determine a highest layer-3 MTU value based on the set of determined layer-3 MTU values. The system can synchronize, via the inter-switch links, the highest layer-3 MTU value. In response to the synchronization, the network device can include a set of highest layer-3 MTU values. A respective highest layer-3 MTU value in the set of highest layer-3 MTU values corresponds to a respective network device in the plurality of network devices. The system can determine, based on the set of highest layer-3 MTU values, a global highest layer-3 MTU value. The system can derive a layer-2 MTU value based on the global highest layer-3 MTU value and can then configure a respective inter-switch link with the layer-2 MTU value.

In a variation on this embodiment, a respective network device is coupled, via a corresponding set of network interfaces, to one or more edge network devices in a wide-area network (WAN) and to one or more devices in a local area network (LAN).

In a variation on this embodiment, the plurality of network devices coupled via the inter-switch links represent a high-availability system. The high availability system can implement one or more of: a multi-chassis link aggregation group (MC-LAG); a Virtual Router Redundancy Protocol (VRRP); and one or more active gateway solutions.

In a variation on this embodiment, the system can dynamically identify a set of updates associated with the set of interfaces. The set of updates associated with the set of interfaces can include one or more of: an addition of a new data path; update of a layer-3 MTU value associated with an existing data path; and removal of an existing data path.

In a further variation, the system can dynamically update, based on the set of updates, the highest layer-3 MTU value and the global highest layer-3 MTU value. The system can then dynamically adjust, based on the updated global highest layer-3 MTU value, the layer-2 MTU value.

In a further variation, the system can derive the layer-2 MTU value based on the highest layer-3 MTU value by: determining, based on an Internet Protocol (IP) header size corresponding to the global highest layer-3 MTU value, the layer-2 MTU value.

In a further variation, the system can determine a path MTU associated with the network device. The system can then synchronize, via the inter-switch links, the path MTU value. In response to the synchronization the network device can include a set of path MTU values. A respective path MTU value in the set of path MTU values can be associated with a respective network device in the plurality of network devices.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

What is claimed is:

1. A method, comprising:
    determining a set of interfaces associated with a network device among a plurality of network devices coupled via inter-switch links;
    determining a set of layer-3 maximum transmission unit (MTU) values corresponding to the set of interfaces;
    determining a highest layer-3 MTU value based on the set of determined layer-3 MTU values;
    synchronizing, via the inter-switch links, the highest layer-3 MTU value, wherein in response to the synchronization, the network device includes a set of highest layer-3 MTU values, and wherein a respective highest layer-3 MTU value in the set of highest layer-3 MTU values corresponds to a respective network device in the plurality of network devices;
    determining, based on the set of highest layer-3 MTU values, a global highest layer-3 MTU value;
    deriving a layer-2 MTU value based on the global highest layer-3 MTU value, wherein the derivation of the layer-2 MTU value is based on the global highest layer-3 MTU value comprises: determining, based on an Internet Protocol (IP) header size corresponding to the global highest layer-3 MTU value, the layer-2 MTU value; and
    configuring a respective inter-switch link with the layer-2 MTU value.

2. The method of claim 1, wherein a respective network device is coupled, via a corresponding set of network interfaces, to one or more edge network devices in a wide-area network (WAN) and to one or more devices in a local area network (LAN).

3. The method of claim 1, wherein the plurality of network devices coupled via the inter-switch links represent a high-availability system; and wherein the high availability system implements one or more of:
    a multi-chassis link aggregation group (MC-LAG);
    a Virtual Router Redundancy Protocol (VRRP); and
    one or more active gateway solutions.

4. The method of claim 1, further comprising:
    dynamically identifying a set of updates associated with the set of interfaces, wherein the set of updates associated with the set of interfaces include one or more of: an addition of a new data path; update of a layer-3 MTU value associated with an existing data path; and update of an existing data path.

5. The method of claim 4, further comprising:
    dynamically updating, based on the set of updates, the highest layer-3 MTU value and the global highest layer-3 MTU value; and
    dynamically adjusting, based on the updated global highest layer-3 MTU value, the layer-2 MTU value.

6. The method of claim 1, further comprising:
    determining a path MTU value associated with the network device; and
    synchronizing, via the inter-switch links, the path MTU value, wherein in response to the synchronization, the network device includes a set of path MTU values, a respective path MTU value in the set of path MTU values being associated with a respective network device in the plurality of network devices.

7. A computer system, comprising:
    a processor; and
    a storage device coupled to the processor and storing instructions, which when executed by the processor cause the processor to perform a method, the method comprising:
        determining a set of interfaces associated with a network device among a plurality of network devices coupled via inter-switch links;
        determining a set of layer-3 maximum transmission unit (MTU) values corresponding to the set of interfaces;
        determining a highest layer-3 MTU value based on the set of determined layer-3 MTU values;
        synchronizing, via the inter-switch links, the highest layer-3 MTU value, wherein in response to the synchronization, the network device includes a set of highest layer-3 MTU values, and wherein a respective highest layer-3 MTU value in the set of highest layer-3 MTU values corresponds to a respective network device in the plurality of network devices;
        determining, based on the set of highest layer-3 MTU values, a global highest layer-3 MTU value;
        deriving a layer-2 MTU value based on the global highest layer-3 MTU value, wherein the derivation of the layer-2 MTU value is based on the global highest layer-3 MTU value comprises: determining, based on an Internet Protocol (IP) header size corresponding to the global highest layer-3 MTU value, the layer-2 MTU value; and
        configuring a respective inter-switch link with the layer-2 MTU value.

8. The computer system of claim 7, wherein a respective network device is coupled, via a corresponding set of network interfaces, to one or more edge network devices in a wide-area network (WAN) and to one or more devices in a local area network (LAN).

9. The computer system of claim 7, wherein the plurality of network devices coupled via the inter-switch links represent a high-availability system, and wherein the high availability system implements one or more of:
    a multi-chassis link aggregation group (MC-LAG);
    a Virtual Router Redundancy Protocol (VRRP); and
    one or more active gateway solutions.

10. The computer system of claim 7, wherein the method further comprises:
    dynamically identifying a set of updates associated with the set of interfaces, wherein the set of updates associated with the set of interfaces include one or more of:
    an addition of a new data path; update of a layer-3 MTU value associated with an existing data path; and removal of an existing data path.

11. The computer system of claim 10, wherein the method further comprises:
    dynamically updating, based on the set of updates, the highest layer-3 MTU value and the global highest layer-3 MTU value; and
    dynamically adjusting, based on the updated global highest layer-3 MTU value, the layer-2 MTU value.

12. The computer system of claim 7, wherein the method further comprises:
    determining a path MTU value associated with the network device; and
    synchronizing, via the inter-switch links, the path MTU value, wherein in response to the synchronization, the network device includes a set of path MTU values, a respective path MTU value in the set of path MTU values being associated with a respective network device in the plurality of network devices.

13. An apparatus, comprising:
one or more processors; and
a storage medium storing instructions that, when executed by the one or more processors, cause the apparatus to perform a method comprising:
  determining a set of interfaces associated with a network device among a plurality of network devices coupled via inter-switch links;
  determining a set of layer-3 maximum transmission unit (MTU) values corresponding to the set of interfaces;
  determining a highest layer-3 MTU value based on the set of determined layer-3 MTU values;
  synchronizing, via the inter-switch links, the highest layer-3 MTU value, wherein in response to the synchronization, the network device includes a set of highest layer-3 MTU values, and wherein a respective highest layer-3 MTU value in the set of highest layer-3 MTU values corresponds to a respective network device in the plurality of network devices;
  determining, based on the set of highest layer-3 MTU values, a global highest layer-3 MTU value;
  deriving a layer-2 MTU value based on the global highest layer-3 MTU value, wherein the derivation of the layer-2 MTU value is based on the global highest layer-3 MTU value comprises: determining, based on an Internet Protocol (IP) header size corresoonding to the global highest layer-3 MTU value, the layer-2 MTU value; and
  configuring a respective inter-switch link with the layer-2 MTU value.

14. The apparatus of claim 13, wherein the plurality of network devices coupled via the inter-switch links represent a high-availability system, and wherein the high availability system implements one or more of:
  a multi-chassis link aggregation group (MC-LAG);
  a Virtual Router Redundancy Protocol (VRRP); and
  one or more active gateway solutions.

15. The apparatus of claim 13, wherein the method further comprises:
  dynamically identifying a set of updates associated with the set of interfaces, wherein the set of updates associated with the set of interfaces include one or more of: an addition of a new data path; update of a layer-3 MTU value associated with an existing data path; and removal of an existing data path.

16. The apparatus of claim 15, wherein the method further comprises:
  dynamically updating, based on the set of updates, the highest layer-3 MTU value and the global highest layer-3 MTU value; and
  dynamically adjusting, based on the updated global highest layer-3 MTU value, the layer-2 MTU value.

17. The apparatus of claim 13, wherein the method further comprises:
  determining a path MTU value associated with the network device; and
  synchronizing, via the inter-switch links, the path MTU value, wherein in response to the synchronization, the network device includes a set of path MTU values, a respective path MTU value in the set of path MTU values being associated with a respective network device in the plurality of network devices.

* * * * *